US010373184B1

(12) United States Patent
Kim et al.

(10) Patent No.: US 10,373,184 B1
(45) Date of Patent: *Aug. 6, 2019

(54) FACILITATING CONSUMER PAYMENTS AND REDEMPTIONS OF DEAL OFFERS

(71) Applicant: Groupon, Inc., Chicago, IL (US)

(72) Inventors: Ben Kim, Sunnyvale, CA (US); Joshua Puckett, Mountain View, CA (US); Andrey Zaytsev, Los Altos, CA (US); Gene Alston, Burlingame, CA (US); Richard Park, San Francisco, CA (US); Thomas Joseph McConnell, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 729 days.

This patent is subject to a terminal disclaimer.

(21) Appl. No.: 13/842,726

(22) Filed: Mar. 15, 2013

Related U.S. Application Data

(60) Provisional application No. 61/661,291, filed on Jun. 18, 2012.

(51) Int. Cl.
*G06Q 30/02* (2012.01)

(52) U.S. Cl.
CPC ..... *G06Q 30/0215* (2013.01); *G06Q 30/0207* (2013.01); *G06Q 30/0238* (2013.01); *G06Q 30/0268* (2013.01)

(58) Field of Classification Search
CPC .................................. G06Q 30/0207–0277
See application file for complete search history.

(56) References Cited

U.S. PATENT DOCUMENTS

| | | | | |
|---|---|---|---|---|
| 6,292,786 | B1* | 9/2001 | Deaton | G06Q 20/0457 |
| | | | | 705/14.25 |
| 2003/0036950 | A1* | 2/2003 | Nguyen | G06Q 20/387 |
| | | | | 705/14.15 |
| 2003/0171096 | A1* | 9/2003 | Ilan et al. | 455/3.06 |
| 2003/0220839 | A1* | 11/2003 | Nguyen | G06Q 20/387 |
| | | | | 705/14.38 |
| 2005/0004839 | A1* | 1/2005 | Bakker | G06Q 20/10 |
| | | | | 705/14.25 |
| 2009/0106115 | A1* | 4/2009 | James et al. | 705/14 |
| 2009/0265228 | A1* | 10/2009 | Sterling | G06Q 30/02 |
| | | | | 705/14.38 |
| 2010/0287103 | A1* | 11/2010 | Mason | G06Q 30/02 |
| | | | | 705/80 |
| 2010/0312632 | A1* | 12/2010 | Cervenka | G06Q 30/02 |
| | | | | 705/14.38 |

(Continued)

OTHER PUBLICATIONS

Promotional Strategies for Small Businesses: Group Buying Deals, Tuten et al., Small Business Institute® Journal © Small Business Institute® 2011, vol. 7, No. 2, 15-29.*

(Continued)

Primary Examiner — David J Stoltenberg
(74) Attorney, Agent, or Firm — Alston & Bird LLP

(57) ABSTRACT

Provided herein are systems, methods and computer readable storage media for facilitating payments for consumer transactions and redemption of deal offerings. In providing such functionality, the system can be configured to, for example, receive payment for one or more products, determine a deal voucher's current value and cause the redemption of the deal voucher.

20 Claims, 14 Drawing Sheets

(56) References Cited

U.S. PATENT DOCUMENTS

| | | | | |
|---|---|---|---|---|
| 2010/0312634 | A1* | 12/2010 | Cervenka | G06Q 20/105 |
| | | | | 705/14.38 |
| 2011/0313840 | A1* | 12/2011 | Mason | G06Q 30/02 |
| | | | | 705/14.35 |
| 2012/0179531 | A1* | 7/2012 | Kim | 705/14.26 |
| 2012/0191534 | A1* | 7/2012 | Tavares | G06Q 30/00 |
| | | | | 705/14.45 |
| 2012/0226540 | A1* | 9/2012 | Batalion | G06Q 30/06 |
| | | | | 705/14.23 |
| 2012/0232982 | A1* | 9/2012 | Durvasula | G06Q 30/02 |
| | | | | 705/14.27 |
| 2012/0271696 | A1* | 10/2012 | Akbar | G06Q 30/02 |
| | | | | 705/14.23 |
| 2012/0271697 | A1* | 10/2012 | Gilman et al. | 705/14.23 |
| 2012/0284102 | A1* | 11/2012 | Shave | G06Q 30/0207 |
| | | | | 705/14.23 |
| 2012/0296716 | A1* | 11/2012 | Barbeau | G06Q 30/02 |
| | | | | 705/14.13 |
| 2013/0013383 | A1* | 1/2013 | Vitti | G06Q 30/0207 |
| | | | | 705/14.16 |
| 2013/0013389 | A1* | 1/2013 | Vitti | G06Q 30/0207 |
| | | | | 705/14.35 |
| 2013/0046605 | A1* | 2/2013 | Baron | G06Q 30/0207 |
| | | | | 705/14.27 |
| 2013/0185125 | A1* | 7/2013 | Celorio-Martinez | |
| | | | | G06Q 30/0211 |
| | | | | 705/14.13 |
| 2013/0185129 | A1* | 7/2013 | Berman | G06Q 30/0207 |
| | | | | 705/14.25 |
| 2013/0304561 | A1* | 11/2013 | Warner | G06Q 30/0226 |
| | | | | 705/14.33 |
| 2014/0081722 | A1* | 3/2014 | Schacht | G06Q 30/0207 |
| | | | | 705/14.15 |

OTHER PUBLICATIONS

Value proposition and social proof in online deals: An exploratory study of Groupon.com, Amblee et al., International Conference on Electronic Commerce '12, Aug. 6-8, 2012, Singapore Management University, Singapore.*
Office Action for U.S. Appl. No. 13/842,813 dated Jul. 30, 2015.
Office Action for U.S. Appl. No. 13/842,813 dated May 19, 2016.
Advisory Action for U.S. Appl. No. 13/842,813 dated Oct. 24, 2016.
U.S. Appl. No. 13/842,813, filed Mar. 15, 2013; in re: Kim et al., entitled *Facilitating Consumer Payments and Redemptions of Deal Offers*.

* cited by examiner

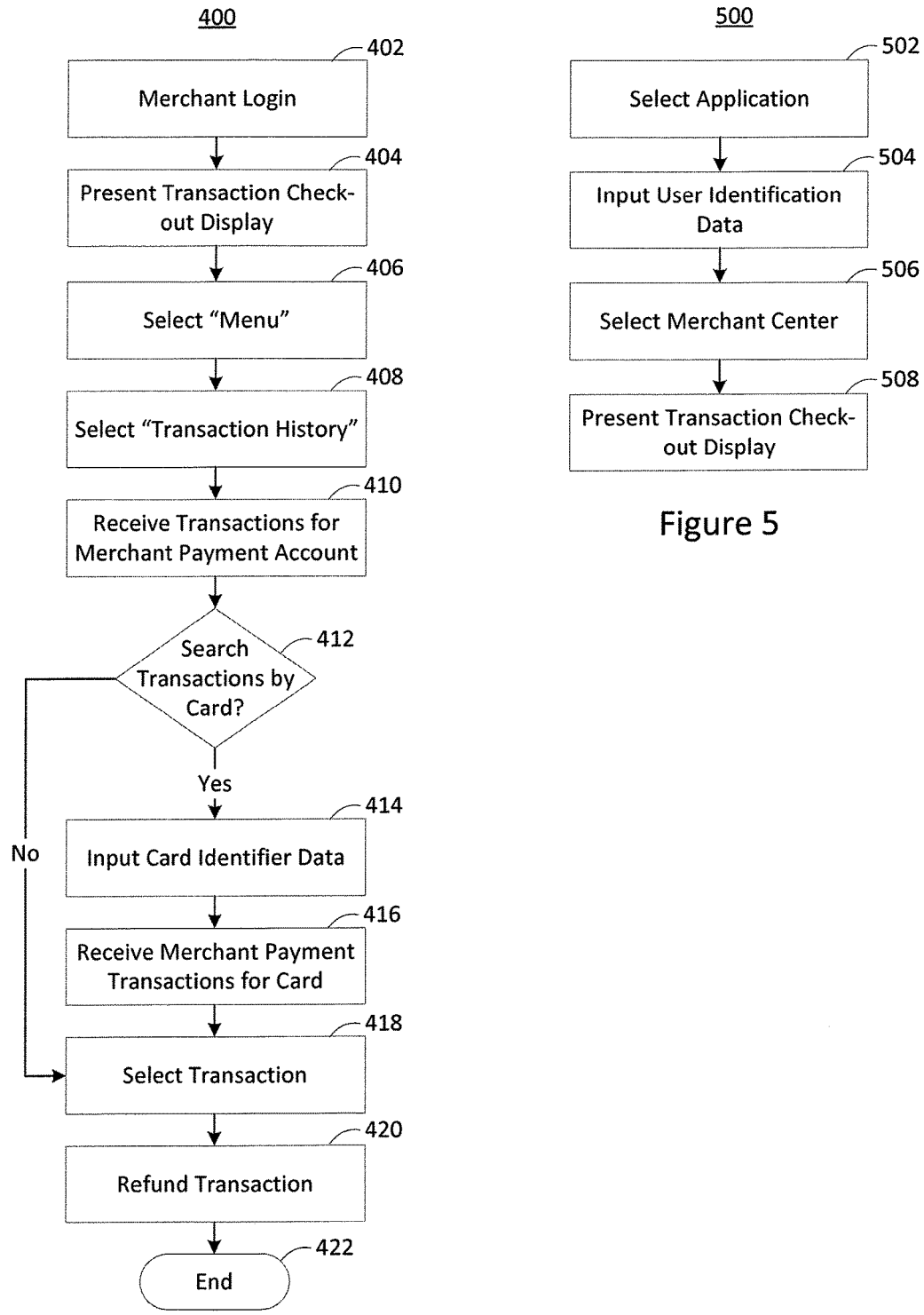

| Merchant Center ID | Merchant User ID | Transaction ID | Voucher ID | Date | Transaction Amount | Voucher Redemption Value | Tax Amount | Payment Type | Credit Card Number | Other Payment Account Number |
|---|---|---|---|---|---|---|---|---|---|---|
| | | | | | | | | | | |

Figure 27

| Voucher ID | Consumer ID | Merchant Center ID | Date | Credit Card Number | Purcahse Value | Discount Value | Validity Period | Redemption Status | Redemption Value |
|---|---|---|---|---|---|---|---|---|---|
| | | | | | | | | | |

FACILITATING CONSUMER PAYMENTS AND REDEMPTIONS OF DEAL OFFERS

CROSS-REFERENCE TO RELATED APPLICATIONS

The present application claims the benefit of U.S. Provisional Application No. 61/661,291, entitled "FACILITATING CONSUMER PAYMENTS AND REDEMPTIONS OF DEAL OFFERS", filed on Jun. 18, 2012, the contents of which are incorporated herein by reference in their entirety.

FIELD

Embodiments of the invention relate, generally, to facilitating payments for consumer transactions and redemption of deal offerings.

BACKGROUND

Merchants sell goods and services (collectively referred to herein as "products") to consumers. The merchants can often control the form of their product offers, the timing of their product offers, and the price at which the products will be offered. The merchant may sell products at a brick-and-mortar sales location, a virtual online site, or both.

Discounts have been used as part of some retail strategies. Discount techniques include providing coupons and rebates to potential consumers, but these techniques have several disadvantages. In this regard, a number of deficiencies and problems associated with the systems used to, among other things, provide and redeem discounts used by consumers have been identified. Through applied effort, ingenuity, and innovation, many of these identified problems have been solved by developing solutions that are included in embodiments of the present invention, some examples of which are described herein.

BRIEF SUMMARY

In general, example embodiments of the present invention provide herein systems, methods and computer readable storage media for facilitating payments for consumer transactions and redemption of deal offerings in a simple and user-friendly manner. Among other things, embodiments discussed herein can be configured to aid merchants in processing large numbers of payment transactions. In completing these payment transactions, merchants devices can be configured to determine what discounts are available to a consumer and how each available discount affects the transaction (e.g., how much money is the discount currently worth). Embodiments discussed herein can be configured to integrate this and other functionality into a single device that facilitates the implementation of various processes, which may run across one or more networks and utilize remote devices to complete a single payment transaction for a consumer.

BRIEF DESCRIPTION OF THE SEVERAL VIEWS OF THE DRAWINGS

Figure 1:
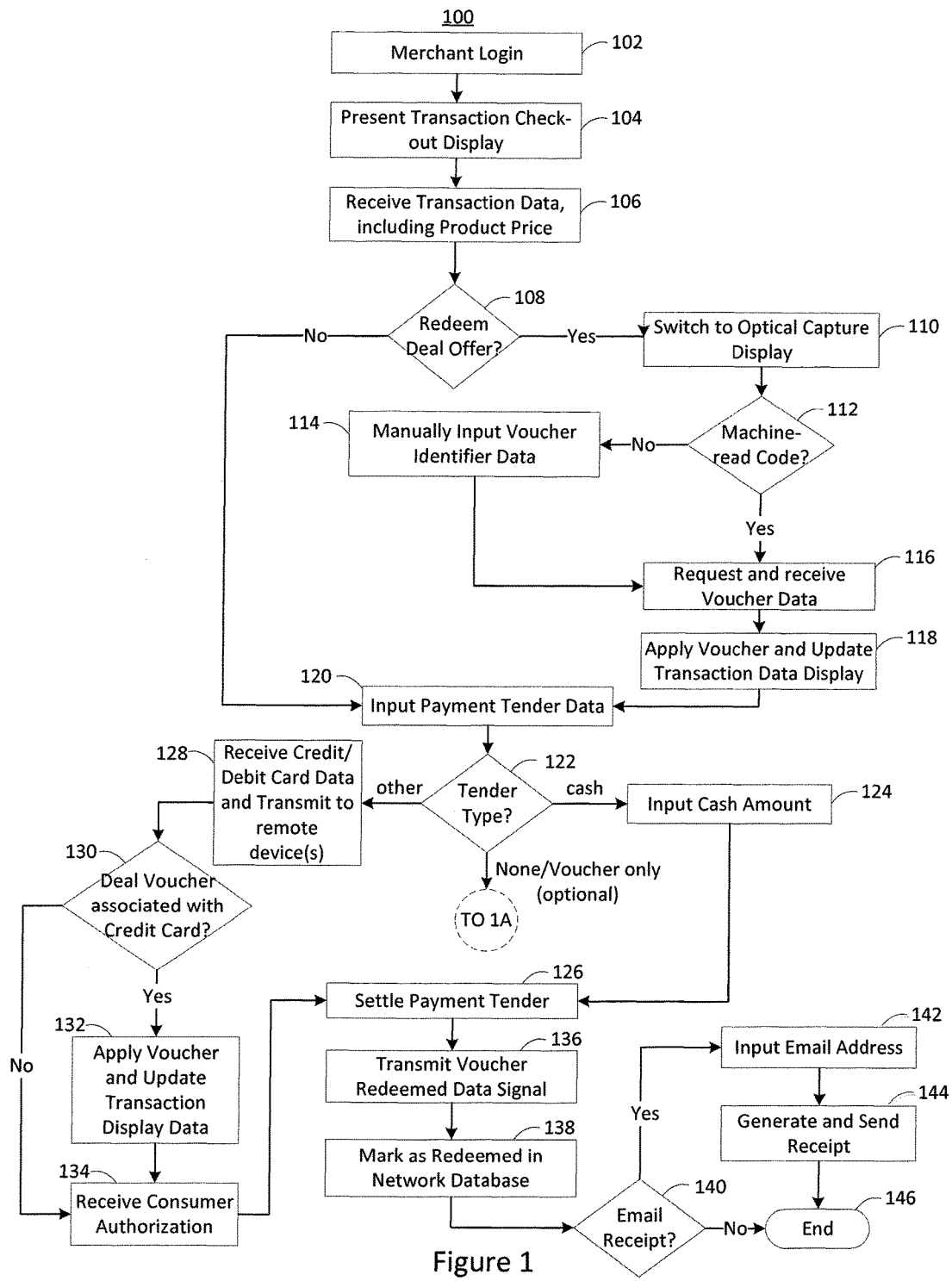
Figure 1A:
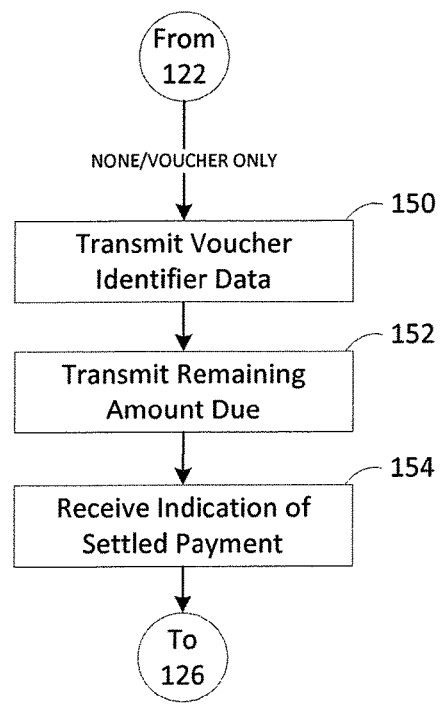
Figure 2:
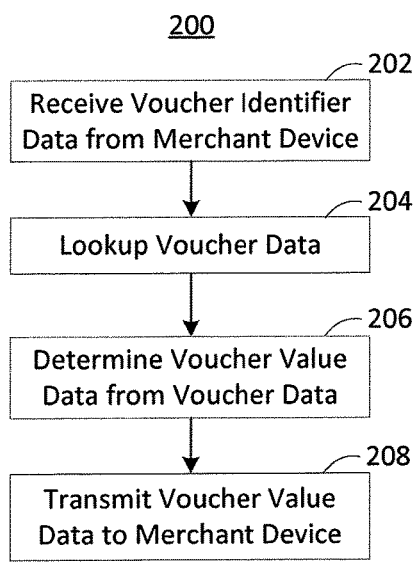
Figure 3:
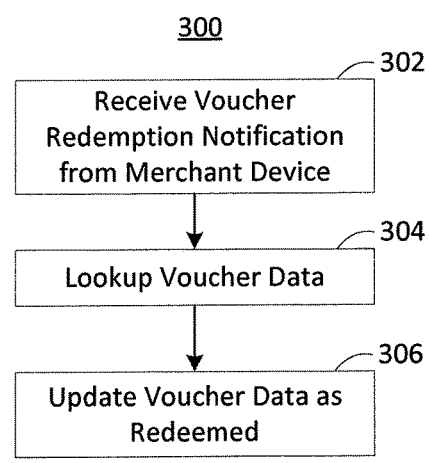
Figure 24:
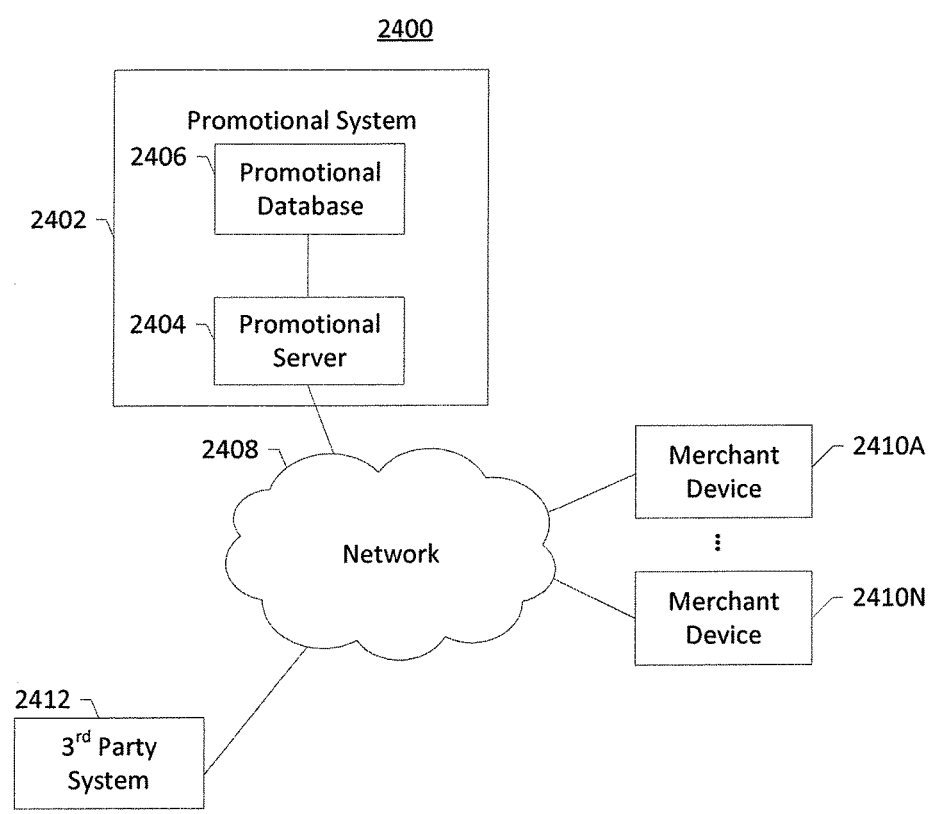
Figure 25:
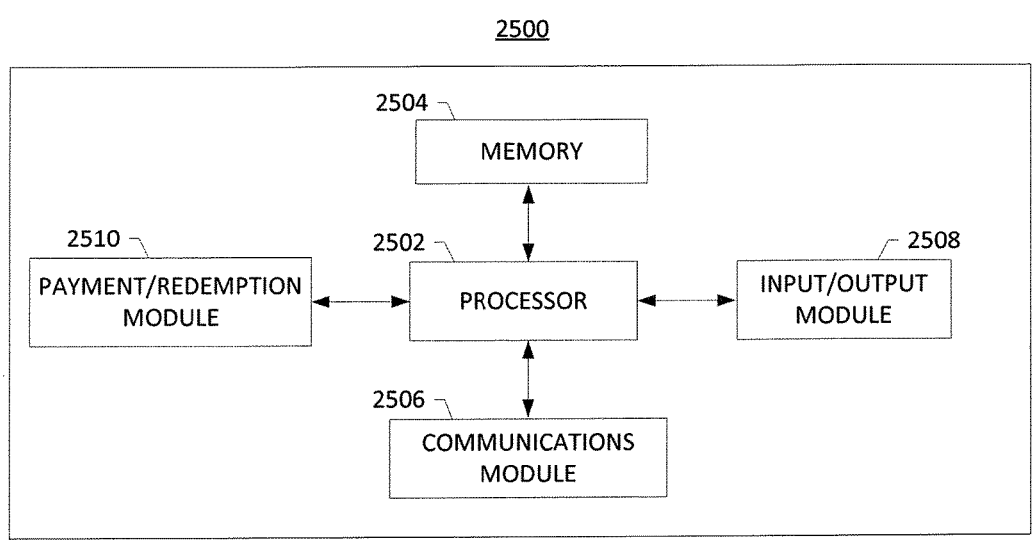
Figure 28:
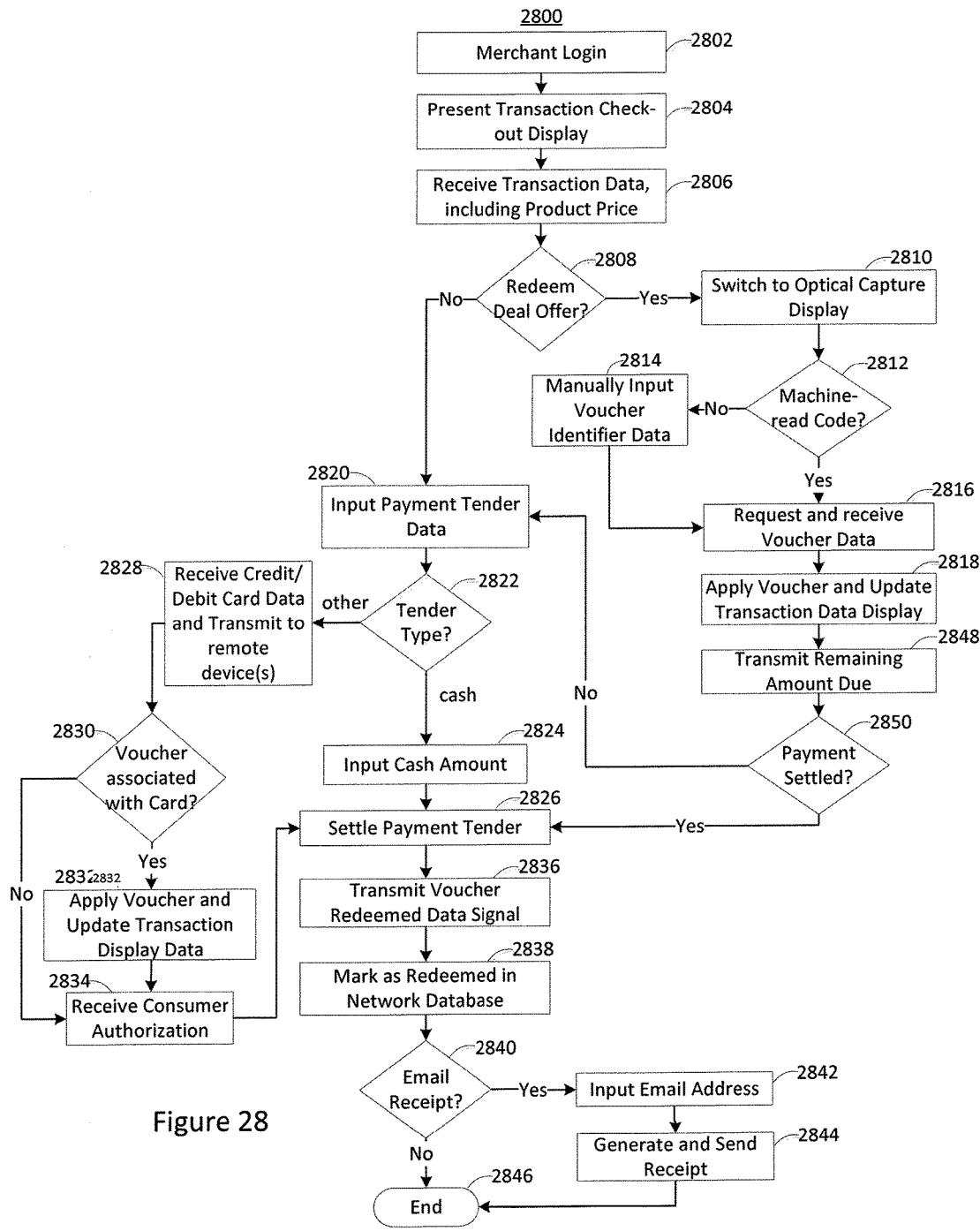
Figure 29:
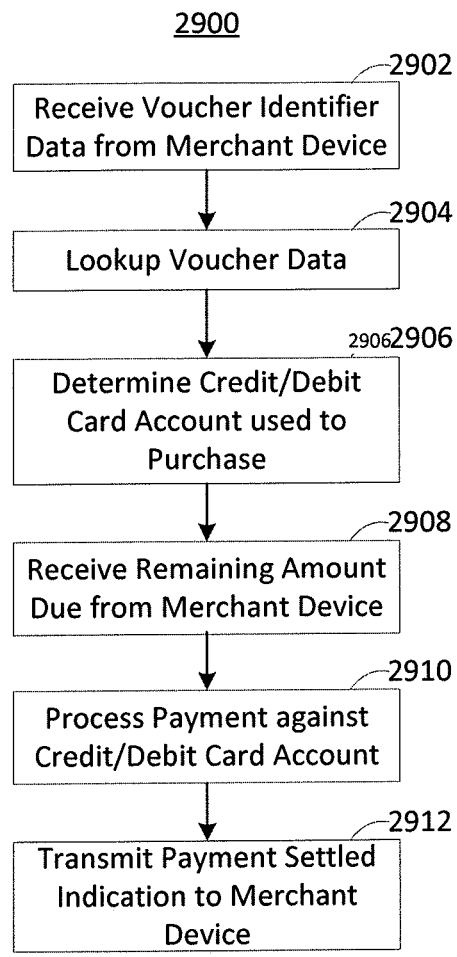

Having thus described embodiments of the invention in general terms, reference will now be made to the accompanying drawings, which are not necessarily drawn to scale, and wherein:

FIG. 1 is a flowchart showing an exemplary process for facilitating a payment for a transaction and a redemption of a deal offering in accordance with some example embodiments discussed herein;

FIG. 1A is a flowchart showing an exemplary process for handling payment of a remaining amount due for a transaction and a redemption of a deal offering in accordance with some example embodiments discussed herein;

FIG. 2 is a flowchart showing an exemplary process for providing deal voucher data during a transaction in accordance with some example embodiments discussed herein;

FIG. 3 is a flowchart showing an exemplary process for updating a deal voucher redemption status in accordance with some example embodiments discussed herein;

FIG. 4 is a flowchart showing an exemplary process for providing payment transaction history in accordance with some example embodiments discussed herein;

FIG. 5 is a flowchart showing an exemplary process for accessing a transaction configuration in accordance with some example embodiments discussed herein;

FIGS. 6-23 show example graphical user interface displays that may be presented by various components of systems or devices in accordance with some example embodiments discussed herein;

FIG. 24 shows an example system in accordance with some example embodiments discussed herein;

FIG. 25 shows a schematic block diagram of circuitry that can be included in a computing device, such as a merchant device, consumer device, and/or promotional system, in accordance with some example embodiments discussed herein;

FIGS. 26-27 are examples of data that may be stored to facilitate operations in accordance with some example embodiments discussed herein;

FIG. 28 is a flowchart showing an exemplary process for handling payment of a remaining amount due for a transaction and redemption of a deal offering in accordance with some example embodiments discussed herein; and FIG. 29 is a flowchart showing an exemplary process for processing a payment transaction in accordance with some example embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

FIGS. 6-23, detailed below, show example displays that may be presented by one or more display screens of one or more machines, sometimes referred to herein as "merchant devices," in accordance with some embodiments discussed herein. For example, the displays of FIGS. 6-23 can be presented to a merchant by a merchant device (such as a smart phone, tablet computer, etc.) and can aid in facilitating the payment for consumer transactions and redemption of a coupon and/or other discount offer for a merchant's product, which are sometimes referred to herein as "deal vouchers" or, more simply, "vouchers." Additional examples of merchant devices and consumer machines are discussed in connection with FIGS. 24 and 25 below.

The displays of FIGS. 6-23 can be used to provide a relatively simple, quick, and intuitive way for the merchant to process a consumer's payment transaction and redeem a consumer's voucher by using one or more third party machines, such as a promotional system or a third-party system. Additional examples of the promotional system are discussed in connection with FIGS. 24 and 25 below. Examples of more general systems and processes that can be used to create deal vouchers by/for a merchant and then be bought and redeemed by a consumer are discussed in commonly-assigned U.S. Patent Application Publication No. 2011/0313840, filed Mar. 17, 2011, titled "SYSTEM AND METHODS FOR PROVIDING LOCATION BASED DISCOUNT RETAILING," which is hereby incorporated by reference in its entirety.

FIG. 1 shows an exemplary process, namely process 100, that may be executed by one or more machines (some examples of which are discussed in connection with FIGS. 24 and 25 below) to provide the displays of FIGS. 6-23 discussed below, among others, in accordance with some example embodiments discussed herein. Process 100 may start at 102 with a merchant user logging in to the system via a merchant device. An example process for logging into the system using the merchant device is shown and discussed in connection with, e.g., FIG. 5.

At 104, process 100 may present a Transaction Checkout Display on a touch-sensitive display screen of a device, such as a merchant device. One such example of the Transaction Checkout Display is provided by display 600 of FIG. 6.

At 106, process 100 receives transaction data for a consumer transaction, such as one or more prices of products included in the consumer transaction. For example, a user may input the transaction data using, for example, a keypad, such as that shown in display 600 in embodiments where a touch-sensitive display screen is included in the merchant device. Additionally or alternatively, transaction data may be received using other means, such as scanning product codes with an optical capture display, such as that shown in display 900 of FIG. 9. In such embodiments, transaction data can be derived from the barcode and/or other product identifier based on information stored about the product remotely (such as in a networked database) and/or locally in the merchant device. After the transaction data is received, the display of the merchant device can be updated to show the price and/or other transaction data (including, for example, product identifying information) as shown in display 800 of FIG. 8.

After completing the entry of transaction data, a determination can be made at 108 as to whether a deal offer is to be redeemed as part of the transaction. For example, the merchant device can be configured to determine whether a deal offer is to be redeemed based on whether an indication of a selection of button 802 of display 800 was received. Upon the indication to redeem a deal offer at 108, such as by selection of button 802 being received by the processor of the merchant device, process 100 transfers at 110 to the display of an Optical Capture Display, such as shown by display 900 of FIG. 9.

At 112, process 100 may capture a machine readable code from a voucher for the deal offer. If at 112 process 100 is unable to capture a machine readable code from a voucher or if an indication is received that a user would like to manually input voucher identifier data at 114 by, for example, selecting button 902 ("Manual") of display 900.

At 114, process 100 may wait for a user to manually input the voucher identifier data. A user may input the voucher identifier data using a display on the touch-sensitive display screen of the merchant device using a display such as that shown by display 1000 of FIG. 10. A determination can be made that the voucher identifier data is complete based on, for example, the merchant device being configured to identify the end of the voucher identifier data automatically and/or in response to receiving an indication of a user selection of a button, such as button 1002 of display 1000.

Figure 11:
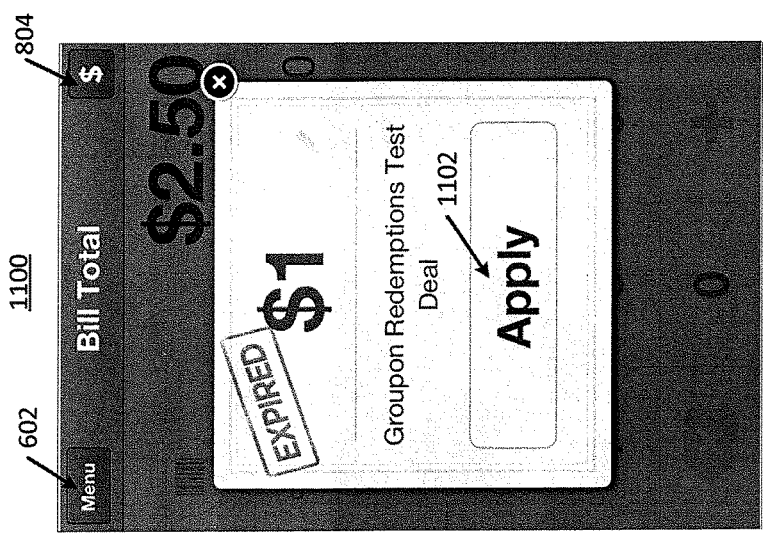

At 116, the merchant device can be configured to transmit the voucher identifier data to a remote system, such as promotional system 2402 shown in FIG. 24, to retrieve voucher data, and receive additional voucher data from a remote system. The voucher data may include a monetary discount value currently associated with the deal voucher that may be used in conjunction with the current transaction. Display 1100 of FIG. 11 shows one example display of a monetary discount value currently associated with the deal voucher. The monetary discount value currently associated with the deal voucher may be less than a discount value previously associated with the deal voucher, or it may be greater than a discount value to be associated with the deal voucher in the future. For example, the monetary discount value may be the full face value discount of the deal voucher if the transaction is occurring during a time period when the deal offer is in force, e.g., the deal voucher time period has not expired. As another example, the monetary discount value may be a reduced value discount of the deal voucher based on the full deal value if the transaction is occurring during a time period when the deal offer is not in force, e.g., the deal voucher is expired or the deal offer time period has not begun.

At 118, the monetary discount value can be applied to the transaction. For example, the monetary discount value received from the remote system can be included in the transaction data display presented by the merchant device. In some embodiments, a user may be provided the opportunity to indicate whether the voucher monetary discount value should be applied to this transaction. For example, button 1102 ("Apply") of display 1100 may be presented and, in response to button 1102 being selected, the voucher monetary discount value is applied to the current transaction by the merchant device by subtracting the monetary discount value from the product price or transaction total and then updating the transaction data display, such as shown by display 1200 of FIG. 12. The merchant device may then return to the Transaction Calculator Display, as shown by display 1300 of FIG. 13, by a user selecting button 804 ("$") of display 1200.

Process 100 may proceed to 120 after 118 and/or after determining at 108 to proceed without redeeming a deal offer at this time. For example, a determination can be made at 108 to proceed directly to 120 in response to receiving an indication of a user selection of button 804 ("$") of display 800 (instead of button 802).

At 120, while presenting display 800 or 1300, for example, the merchant device may receive an indication to continue with the payment transaction, such as by a user selecting button 804. Upon a user selecting button 804, the merchant device can be configured to present a payment tender selection display, such as display 1400 of FIG. 14.

At 122, process 100 may wait for an indication of a payment tender type to use for the current transaction. A user may indicate the payment tender type by selecting a tender option, such as those shown by display 1400. While display 1400 only shows two tender types, "Card Number" (for credit card payment) and "Cash," the payment tender types may be any type of payment tender, such as cash, credit card, bank draft, electronic check, wire transfer, third party electronic payment services (e.g., PayPal®, etc.), other types of credit or payment services, and/or any other means for conveying value in exchange for the product. In some embodiments, a consumer may also select to have a payment processed by the remote system providing the voucher data, such as promotional system 2400. Such an embodiment will be further described with regard to FIG. 1B below.

If, at 122, a user selects "Cash," process 100 may continue to 124 where merchant device may display a cash tender display, such as display 1500 of FIG. 15, and may wait to receive input of cash tender data. A user may indicate the cash tender amount by using a display, such as display 1500, on a touch-sensitive display screen. A user may indicate that the cash payment tender is complete by, for example, selecting button 1502 ("Tender") of display 1500. Upon the merchant device receiving the input from the selection of button 1502, process 100 may continue to 126 to settle the payment tender (e.g., receive cash in exchange for the product(s) being purchased).

If, at 122, a user selects "Card Number" or another alternative form of payment presented in display 1400, which may involve communicating with a remote device and/or receiving an account number or other identifying information of the consumer, process 100 may continue to 128 where the merchant device may present an appropriate display. To avoid over complicating the discussion, an example set of displays based on credit cards is shown in the drawings and described herein, but similar functionality can be provided in connection with any suitable form of payment without departing from the spirit of the invention.

Display 1600 of FIG. 16 is an example credit card tender display that can be presented at 128 and used to facilitate the reception of credit card data, such as the credit card account number. The credit card data may be received by the merchant device using a magnetic strip reader, near field communication technology, a user manually entering it, and/or by any other suitable means of conveying date. For example, a user may type the credit card number in using the keypad included in display 1600. As another example, a user may swipe a credit card at the merchant device after which the merchant device can be configured to display the credit card tender display, such as display 1600. A user may indicate that the credit card payment tender is complete by, for example, selecting button 1602 ("Continue") of display 1600.

Upon the merchant device receiving the input from the selection of button 1602, process 100 continues to 130 in some embodiments. At 130, the system can be configured to determine whether an applicable deal voucher offer is associated with the form of payment being used at the particular merchant. For example, a consumer may have a purchased a deal voucher using the same credit card account number tendered to the merchant device. In some embodiments, the system may determine whether a consumer has purchased an applicable deal voucher using the consumer's credit card account number if no voucher was indicated for redemption at operation 108 above. In some embodiments, the system may determine whether a consumer has purchased an applicable deal voucher using the consumer's credit card account number even if a deal voucher was redeemed at operation 108, such as if a consumer has purchased more than one deal voucher that may be applicable to the transaction. In addition to or instead of transmitting the credit card account number to the credit card company machine(s), the credit card account number can be transmitted to one or more promotional machines to determine if the credit card tendered to the merchant was used to purchase a deal voucher that was not presented to the merchant earlier in the process. In some embodiments, merchant identifying data (such as an internet protocol address, merchant identifying number, etc.), product identifying data and/or any other transaction data (such as time of day, total cost of products being purchased, tax information, etc.) can be transmitted along with the credit card account number to the one or more promotional machines to aid in determining whether the credit card tendered to the merchant was used to purchase an applicable deal voucher. For example, some deal vouchers may be specific to particular transactions.

In some embodiments, the functionality of 130 may only be implemented in response to determining at 108 the consumer has not presented a deal offer voucher to the merchant to be redeemed. In other embodiments, the functionality of 130 may be omitted from process 100 altogether. In this regard, one or more steps and/or functionalities discussed herein can be reordered, omitted, combined and/or otherwise modified or omitted altogether.

In response to determining at 130 that there is an applicable deal voucher available for the consumer to use for this particular transaction, the deal voucher monetary value can be applied at 132 and the transaction display can be updated. For example, displays 1100, 1200 and 1300 can be presented as discussed herein.

In addition to or instead of determining whether an applicable deal was previously purchased by the consumer, a determination can be made by process 100 as to whether there is an applicable deal offer being marketed by the promotional system and/or merchant that the consumer has not yet purchased. In such instances, the consumer may be provided an option to purchase and/or otherwise redeem the available, applicable previously-unknown deal offer at the merchant device. For example, if a Groupon® deal is being offered online that is applicable to what the consumer is currently purchasing from the merchant, the consumer may be provided the opportunity to purchase the deal at the merchant's device during the point-of-sale, even if the consumer did not otherwise know of the deal being offered online. In some embodiments, like other functionality discussed herein, the merchant may be provided one or more configuration settings that can be used to enable and/or disable the point-of-sale deal offer functionality, which can be used to control whether the consumer can learn of such applicable previously-unknown deal offers while using the merchant device as a point-of-sale machine.

After 132, in response to determining at 130 that there is no deal voucher associated with the credit card, after 128 in embodiments that omit 130 and 132, and/or after determining there is no previously-unknown deal offers, merchant device may provide an authorization display at 134, such as display 1700 of FIG. 17, that can be configured to receive consumer authorization that may be needed to settle the payment with the third party.

At 126, merchant device may receive a consumer authorization by capturing, for example, a consumer signature on the display, such as shown by display 1800 or FIG. 18. After receiving a consumer authorization, process 100 may settle the payment tender. For other payment tender types, operations similar to the cash tender and credit card tender described above, or additional operations, may be completed as appropriate. For example, at 126, process 100 completes the payment tender process by communicating with a third-party system to finalize the payment tender and settle the transaction by transmitting a final amount.

At 138, process 100 may transmit a data signal to a remote system, such as promotional system 2402, to indicate that the voucher has been redeemed. At 138, process 100 may cause one or more databases to be updated to indicate that the voucher has been redeemed. The databases may be maintained by, for example, the promotional system.

Figure 19:
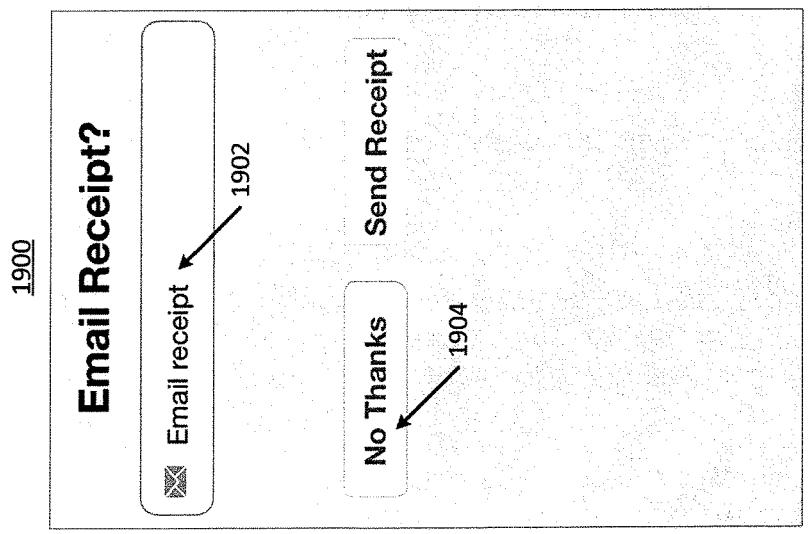
Figure 23:
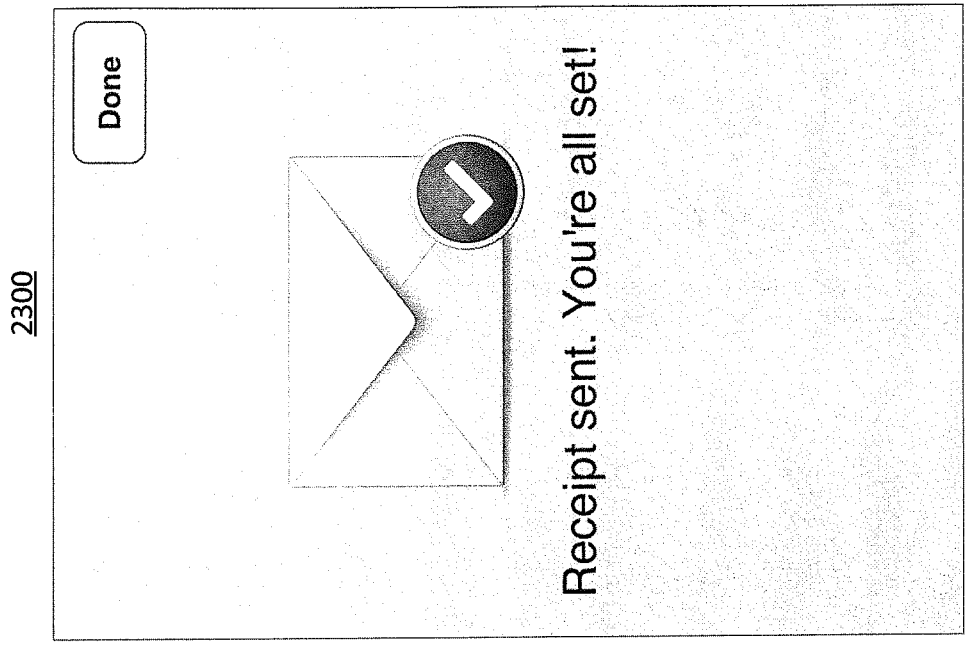
Figure 22:
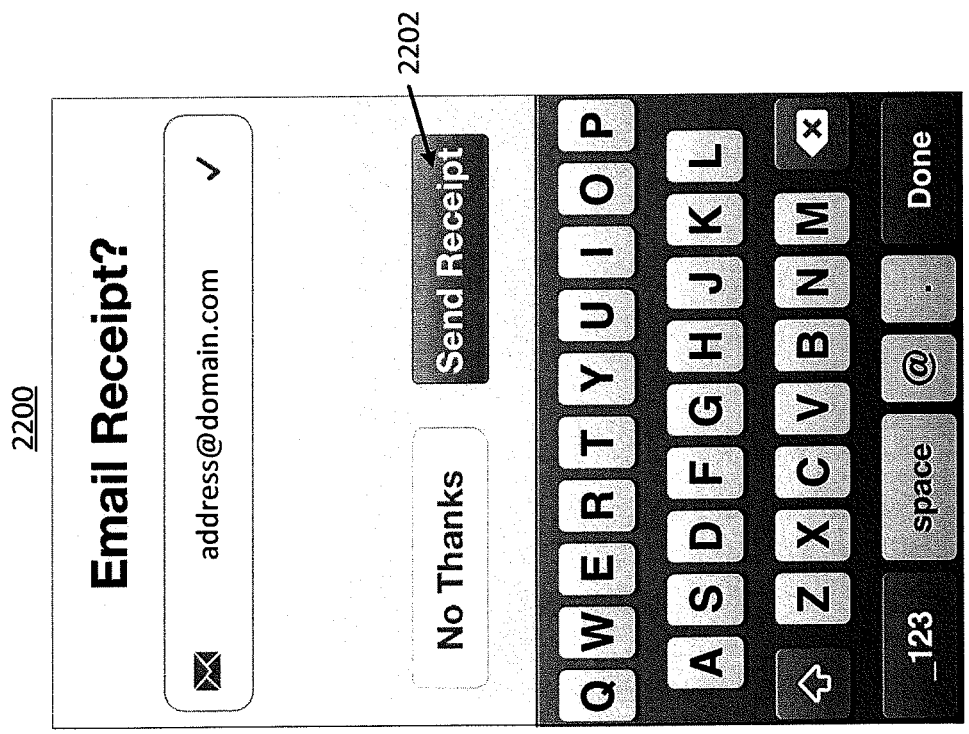

At 140, process 100 may wait for an indication to send an email receipt to the consumer and the merchant device may display a receipt request display, such as display screen 1900 of FIG. 19. A user may indicate that a receipt should be emailed by selecting an email address entry field, such as field 1902. Upon a user indicating that an email receipt should be generated, merchant device may display an email entry display, such as display 2000 of FIG. 20.

At 142, process 100 may receive a consumer email address by a user entering an email address on a display such as displays 2000 and 2100. A user may begin to enter an email address and the display may be updated to suggest previous and/or otherwise known entries for a user to select, as shown in displays 2000 and 2100. Upon a user completing entry of an email address (or selecting a suggested address), the merchant device may display an email confirmation display, such as display 2200 of FIG. 22. In some embodiments, the consumer's email address or addresses may be downloaded from the promotional system and/or otherwise determined based on an associated with the deal voucher that is being redeemed.

At 144, the merchant device may receive an indication to generate and send the receipt email. For example, a user may indicate that the email should be sent by selecting button 2202 ("Send Receipt") of display 2200. After the receipt email has been transmitted, merchant device may display a transaction confirmation display, such as display 2300 of FIG. 23. Process 100 then ends at 146.

If at 140, process 100 receives an indication that a receipt email should not be sent, process 100 ends at 146. Process 100 may also end at 146 in response to determining the receipt is not to be emailed (and, for example, printed instead).

In some embodiments, once the voucher monetary discount value has been applied to the current transaction (such as at 118 of FIG. 1), any remaining amount due on the transaction may be settled using one or more payment methods, as illustrated by FIGS. 1, 1A, and 28. In some embodiments, the remaining amount due for the current transaction may be settled by the remote system providing the voucher data, by a payment transaction processed through the merchant device and a third party such as a payments processor (e.g., a credit card transaction), by an in-person transaction with a consumer (e.g. a cash transaction), or the like.

In some embodiments, the merchant device may provide a means for a user to select one of several payment methods including processing a payment through the promotional system 2402/voucher only payment, a cash payment, a credit or debit card payment transaction, etc., such as by providing a display 1400 at the merchant device, and as illustrated in FIGS. 1 and 1A.

In an example embodiment, after the monetary discount value is applied to the transaction at 118 of FIG. 1, the merchant device may receive an indication to continue with the payment transaction, such as by a user selecting button 804. Upon a user selecting button 804, the merchant device can be configured to present a payment tender selection display at 120, such as display 1400 of FIG. 14. The payment tender selection display may present the user with payment tender options including processing a payment through the promotional system 2402/voucher only, processing a payment as a credit card or debit card transaction (e.g., using a third-party payment processor, for example), processing a cash payment transaction, or the like. In some embodiments, once an indication of a payment tender type has been provided at 122 of FIG. 1, the system may determine that the tender type "None/Voucher Only" was selected and processing may continue to 150 of FIG. 1A. At 150, the merchant device may transmit the voucher identifier data to a remote system, such as promotional system 2402 shown in FIG. 24. Alternatively, in some embodiments, the merchant device may transmit an indication to the remote system that the remote system should process the payment transaction by using the voucher identifier previously transmitted, such as described in regard to 116 of FIG. 1. The process may continue to 152 where the merchant device may transmit the remaining amount due to promotional system 2402. The promotional system 2402 may process a payment for the remaining amount due using a consumer's payment method stored in the promotional system 2402, such as the payment method used to purchase the original voucher or a payment method stored by the consumer in a consumer profile at the promotional system 2402, for example, and as described with regard to FIG. 29 below. At 154, the merchant device may receive an indication from the promotional system 2402 that the payment has been completed and processing may return to 126 of FIG. 1 where the merchant device may indicate that the transaction has been settled and process 100 may continue.

In some embodiments, when the payment for the remaining amount due is settled by the remote system, such as promotional system 2402, the promotional system 2402 may credit an account associated with the merchant for the settled amount, or for the settled amount less one or more processing fees.

According to one example, a user may complete a transaction having a total value of $30.00 and the promotional system may indicate that the submitted voucher has a voucher monetary discount value of $20.00. The merchant device may then apply the $20.00 voucher monetary discount value to the $30.00 current transaction, leaving a remaining amount due of $10.00. The merchant device may then transmit the remaining amount due value of $10.00 to the promotional system and the promotional system may process a payment of $10.00 using the consumer's credit card information on file in the promotional system and then transmit an indication to the merchant device that the payment has been completed.

In some embodiments, if a voucher was applied to the transaction, the payment transaction for the remaining amount due may be automatically transmitted to the remote system, such as promotional system 2402, for processing, as illustrated in FIG. 28. Many of the operations illustrated in FIG. 28 are identical to the operations described in regard to FIG. 1 above, and as such, these operations will not be described in detail in regard to FIG. 28.

FIG. 28 shows an exemplary process, namely process 2800, which may be executed by one or more machines for facilitating payment of a remaining amount due for a transaction and redemption of a deal offering. Process 2800 may start at 2802 with a merchant user logging in to the system via a merchant device. At 2804, process 2800 may present a Transaction Checkout Display on a touch-sensitive display screen of a device, such as a merchant device. At 2806, process 2800 receives transaction data for a consumer transaction, such as one or more prices of products included in the consumer transaction.

After completing the entry of transaction data, a determination can be made at 2808 as to whether a deal offer is to be redeemed as part of the transaction. Upon the indication to redeem a deal offer at 2808 (Yes branch of 2808), process 2808 may switch at 2810 to the display of an Optical Capture Display, such as shown by display 900 of FIG. 9. At 2812, process 2800 may capture a machine readable code from a voucher for the deal offer. If at 2812 process 2800 is unable to capture a machine readable code from a voucher or if an indication is received that a user would like to manually input voucher identifier data at 2814 by, for example, selecting button 902 ("Manual") of display 900. A determination can be made that the voucher identifier data is complete based on, for example, the merchant device being configured to identify the end of the voucher identifier data automatically and/or in response to receiving an indication of a user selection of a button, such as button 1002 of display 1000.

At 2816, the merchant device can be configured to transmit the voucher identifier data to a remote system, such as promotional system 2402 shown in FIG. 24, to retrieve voucher data, and receive additional voucher data from a remote system. The voucher data may include a monetary discount value currently associated with the deal voucher that may be used in conjunction with the current transaction. At 2818, the monetary discount value can be applied to the transaction. For example, the monetary discount value received from the remote system can be included in the transaction data display presented by the merchant device.

After the monetary discount value is applied to the transaction at 2818, the merchant device may transmit the remaining amount due may for the transaction to a remote system, such as promotional system 2402, at 2848. At 2850, the merchant device may receive an indication from the promotional system 2402 regarding the status of the payment for the remaining amount due. If at 2850, an indication is received that the payment was settled (e.g., the payment for the remaining amount was charged to the consumer), process 2800 may continue to 2826 where the merchant device settles the current transaction. If at 2850, an indication is received that the payment was not settled (e.g., the payment account information could not be processed by promotional system 2400), process 2800 may continue to 2820 where the merchant device the merchant device may prompt for an input of payment tender data to complete the transaction.

Alternatively, is a determination is made at 2808 that no deal offer is to be redeemed as part of the transaction, process 2800 may continue to 2820 where the merchant device may be configured to present a payment tender selection display. At 2820, the merchant device may receive an indication of a payment tender type. At 2822 the merchant device may make a determination of the tender type and determine how to proceed with payment of the transaction.

If, at 2822, an indication is received for a cash tender, process 2800 may continue to 2824 where merchant device may receive input of cash tender data. Upon the merchant device receiving the input of the cash tender data, process 2800 may continue to 2826 to settle the payment tender for the current transaction.

If, at 2822, an indication is received for a credit/debit card tender (or a similar type of credit payment tender), process 2800 may continue to 2828 where the merchant device may present an appropriate display. At 2828, the merchant device may receive the credit/debit card data from the consumer and transmit it to a card processor for authorization and settlement, for example. In some embodiments, at 2828, process 2800 may also transmit the credit/debit card data to the promotional system 2400 to determine if there is an available deal voucher associated with the consumer's credit/debit card. For example, a consumer may have a purchased a deal voucher using the same credit card account number tendered to the merchant device which is applicable to the current transaction but was not presented to the merchant at operation 2808. At 2830, the system may be configured to determine whether an applicable deal voucher offer is associated with the payment account (e.g., credit card) being used at the particular merchant.

In response to determining at 2830 that there is an applicable deal voucher available for the consumer to use for this particular transaction, the deal voucher monetary value can be applied at 2832 and the transaction display can be updated and process 2800 may continue to 2834. If, at 2830, it is determined that there is not an applicable deal voucher available, process 2800 may continue to 2834. At 2834, the merchant device may receive any consumer authorization that may be needed to settle the payment, such as a signature or the like.

At 2826, process 2800 may settle the payment tender. At 2838, process 2800 may transmit a data signal to a remote system, such as promotional system 2402, to indicate that the voucher has been redeemed.

At 2840, process 2800 may wait to receive an indication of whether an email receipt should be sent to the consumer. If, at 2840, process 2800 receives an indication that a receipt email should not be sent, process 2800 ends at 2846. If, at 2840, process 2800 receives an indication that a receipt email should be sent to the consumer, process 2800 may receive a consumer email address at 2842. At 2844, the merchant device may receive an indication to generate and send the receipt email. After the receipt email has been transmitted, process 2800 then ends at 2846.

FIG. 29 shows an exemplary process, namely process 2900, which may be executed by one or more systems for processing a payment at a remote system using voucher data to facilitate a transaction in accordance with some example embodiments discussed herein. Process 2900 may start at 2902 by a system, such as promotional system 2402, receiving voucher identifier data from a merchant device (such as at 150 of FIG. 1A).

At 2904, process 2900 retrieves voucher data from one or more databases based on the identifier data received from the merchant device. At 2906, process 2900 may determine the payment account that was used to purchase the voucher, such as a consumer's credit or debit card.

At 2906, process 2900 may receive the remaining amount due from the merchant device (such as from 152 of FIG.

1A). At 2910, process 2900 may process a payment transaction against the consumer payment account (e.g., consumer credit/debit card) for the remaining amount due.

At 2912, process 2900 may transmit an indication to the merchant device that the payment has been settled. In some embodiments, the system, such as promotional system 2900, may credit a merchant's account for the amount of the payment transaction, or may credit a merchant's account for the amount of the payment transaction less a processing fee.

FIG. 2 shows an exemplary process, namely process 200, which may be executed by one or more systems for retrieving deal voucher data to facilitate a transaction in accordance with some example embodiments discussed herein. Process 200 may start at 202 by a system, such as promotional system 2402, receiving voucher identifier data from a merchant device (such as at 116 of process 100 of FIG. 1).

At 204, process 200 retrieves voucher data from one or more databases based on the identifier data received from the merchant device.

At 206, process 200 may determine voucher value data using the retrieved voucher data. Voucher value data may comprise a validity status and a monetary discount value for the identified voucher. Voucher value data may be determined by comparing the current day, date, and/or time with a validity period in the voucher data and based on this comparison determine what the current monetary discount value is for the identified voucher from value information in the voucher data.

At 208, process 200 may transmit the voucher value data to the merchant device to facilitate the transaction. In an alternative embodiment, process 200 may receive identifier data comprising merchant identifier data and a consumer credit card number, rather than voucher identifier data, and use this identifier data to retrieve the voucher data from one or more databases.

FIG. 3 shows an exemplary process, namely process 300, which may be executed by one or more systems for updating deal voucher data to facilitate a transaction in accordance with some example embodiments discussed herein. Process 300 may start at 302 by a system, such as promotional system 2402, receiving a voucher redemption notification from a merchant device (such as at 136 of process 100 of FIG. 1). The voucher redemption notification may comprise at least one or more of voucher identifier data, redemption date and/or time data, and redemption value data. At 304, process 300 retrieves voucher data from one or more databases based on the voucher redemption notification received from the merchant device. At 306, process 300 updates one or more databases as appropriate to record that the voucher was redeemed (such as at 138 of process 100 of FIG. 1).

FIG. 4 shows an exemplary process, namely process 400, which may be executed by one or more systems to provide updating payment and redemption transaction history in accordance with some example embodiments discussed herein. Process 400 may start at 402 with a merchant user logging in on a merchant device.

At 404, process 400 may present a Transaction Checkout Display on a touch-sensitive display screen of a device, such as a merchant device. One such example of the Transaction Checkout Display is provided by display 600 of FIG. 6.

At 406, process 400 may receive an indication from a user to display a menu, such as by a user selecting button 602 ("Menu") of display 600 on a touch-sensitive display screen of the merchant device. Upon receiving an indication that button 602 was selected, merchant device may present a Menu display, such as display 700 of FIG. 7.

At 408, process 400 may receive an indication from a user to display transaction history for a merchant account, such as by a user selecting "Transaction History" from the menu listing of display 700 on a touch-sensitive display screen of the merchant device. At 410, process 400 may retrieve a listing of recent transactions completed on the merchant account to be displayed on the merchant device.

At 412, process 400 may receive an indication that a user wants to search for a particular transaction using card identifier data, such as data associated with a consumer's credit card. At 414, process 400 may receive card identifier data. At 416, process 400 may retrieve a listing a merchant transactions that are associated with the card identifier data to be displayed on the merchant device. In some embodiments, other data may be used as the search query, such as consumer name, address, date of purchase, location of purchase, and/or any other information that may be stored locally and/or remotely associated with the transaction, promotional system and/or deal offers.

At 418, process 400 may receive a selection of a particular transaction from, for example, the listing display provided at 410 or from the listing display provided at 416. The merchant device may display the transaction details for the selected transaction.

At 420, process 400 may receive an indication that the transaction selected at 418 should be reversed, thereby facilitating a payment refund to the consumer in any suitable manner. Process 400 ends at 422.

FIG. 5 shows an exemplary process, namely process 500, which may be executed by one or more systems to provide access to a payment and redemption application in accordance with some example embodiments discussed herein. Process 500 may start at 502 with a merchant user selecting to activate the payment and redemption application on a merchant device. At 504, process 500 may receive user identification data on a touch-sensitive display screen of the merchant device, and determine zero or more merchant centers for which the user identification data is authorized. At 506, in response to determining the user identification data is authorized for one or more merchant centers, process 500 may display a listing of the authorized merchant centers. A user may select a merchant center from the listing which is to be used for facilitating payment and redemption transactions. At 508, process 500 may present a Transaction Checkout Display, such as display 600 of FIG. 6.

FIGS. 6-23 show example displays that may be presented by one or more display screens of one or more merchant devices in accordance with some embodiments discussed herein. The displays of FIGS. 6-23 can be used to provide a relatively simple, quick, and intuitive way for the merchant to process a consumer's payment transaction and redeem a consumer's voucher by using one or more third party machines, such as a promotional system or a third-party system.

Although the displays of FIGS. 6-23 are shown as being optimized for a touch-sensitive device, the functionality discussed in connection with the displays of FIGS. 6-23 may be provided by one or more machines having any suitable display screen in accordance with embodiments discussed herein. For example, the display may be provided by a machine that has a non-touch-sensitive display and a mouse and/or other input component (such as, e.g., a touch pad, keyboard, camera, etc.).

Figure 6:
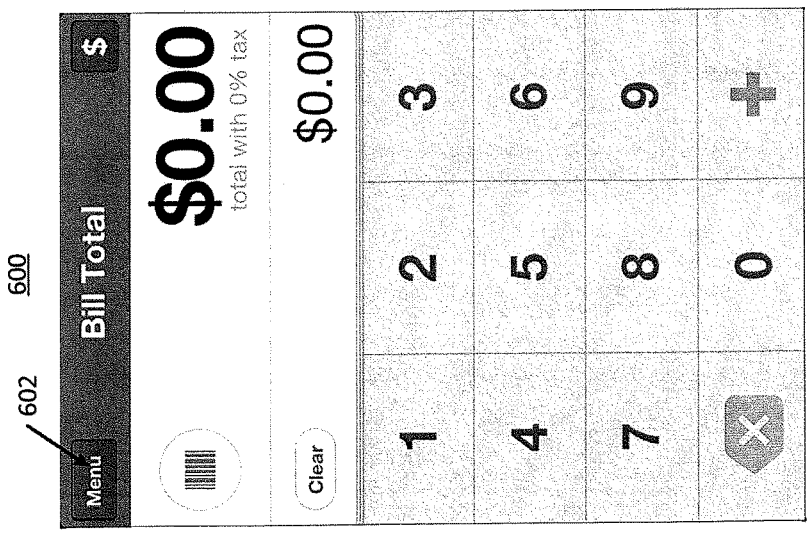

FIG. 6 shows an exemplary presentation of a Transaction Checkout Display in accordance with some example embodiments discussed herein. Display 600 may be presented to a user upon launching a payment and redemption application as described in accordance with some example embodiments discussed herein. Display 600 may provide a user interface for a merchant device to receive transaction data to facilitate payment and redemption. Button 602 ("Menu") may provide an indication for a merchant device to display a menu display, such as display 700 of FIG. 7.

Figure 7:
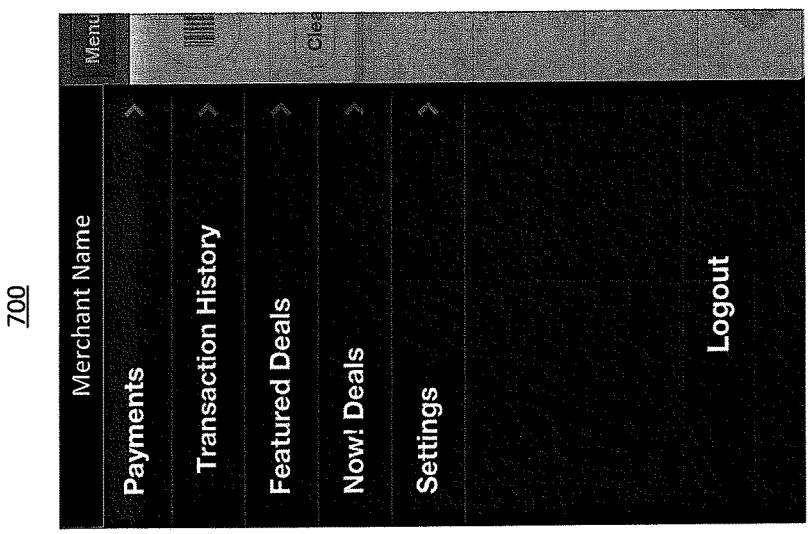

FIG. 7 shows an exemplary presentation of a Menu Display in accordance with some example embodiments discussed herein. Display 700 may be presented to a user upon providing an indication, such as selecting button 602 on display 600. Display 700 may provide a user interface for a user to select from several submenus. Some example menu selections may include "Payments" to return to the Transaction Checkout Display of display 600; "Transaction History" to provide access to a listing of recent transactions on a merchant account; "Featured Deals" to provide access to a listing of past, current, or future deal offers associated with a merchant (although, in some embodiments, managed and marketed by an independent promotional system); "Now! Deals" to provide access to a listing of past, current, or future Now! Deal offers associated with a merchant; "Settings" to provide access to settings to be used within the application.

Button 602 ("Menu") may provide an indication for a merchant device to display a menu display, such as display 700 of FIG. 7.

Figure 8:
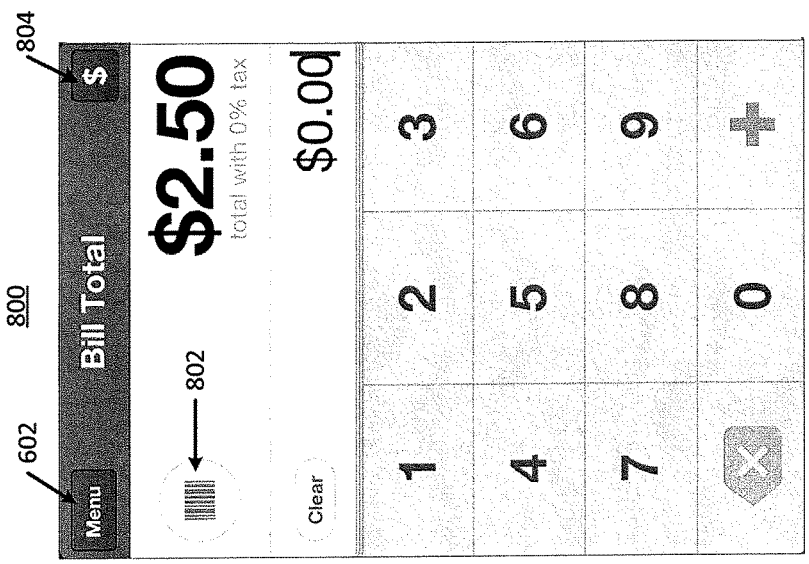

FIG. 8 shows another exemplary presentation of a Transaction Checkout Display in accordance with some example embodiments discussed herein. Display 800 shows a display of current transaction data that has been entered on the merchant device. Button 802 may provide for an indication that a user wishes to enter deal voucher data to be used in conjunction with the current transaction. Selection of Button 802 may cause the merchant device to provide an Optical Capture Display, such as display 900 of FIG. 9. Button 804 may provide for an indication that a user has completed entering transaction data and wishes to switch to a Payment Tender Display, such as display 1400 of FIG. 14.

Figure 9:
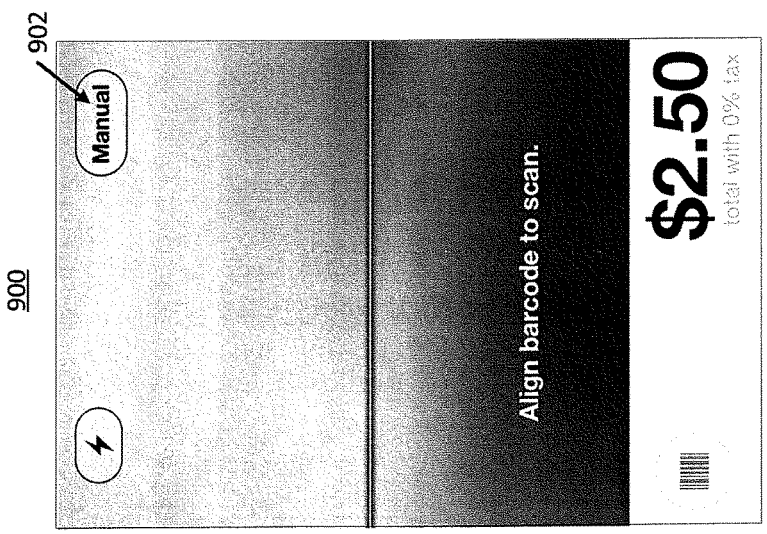

FIG. 9 shows an exemplary presentation of an Optical Capture Display in accordance with some example embodiments discussed herein. Display 900 may be presented by a merchant device upon receiving an indication, such as selection of button 802 on display 800. Display 900 may provide a user interface for a user to capture voucher identification data using optical scanning capabilities of the merchant device. The capture of voucher identification data may cause the merchant device to receive voucher value data in accordance with some example embodiments discussed herein. Additionally, display 900 may provide for a user to indicate a desire to manually input voucher identification data, such as by selecting button 902. Selection of button 902 may cause the merchant device to display a Manual Input Display, such as display 1000 of FIG. 10.

Figure 10:
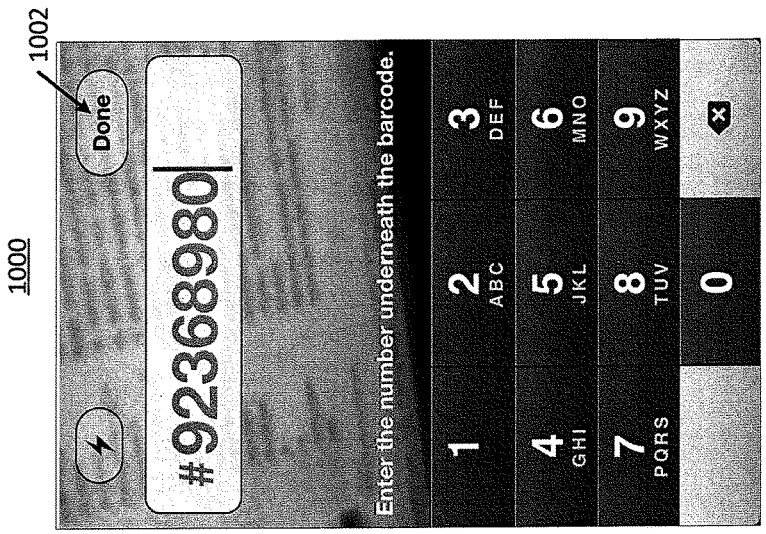

FIG. 10 shows an exemplary presentation of a Manual Voucher Input Display in accordance with some example embodiments discussed herein. Display 1000 may be presented by a merchant device upon receiving an indication, such as selection of button 902 on display 900, that a user wishes to manually input voucher identification data. A user may indicate the completion of input of voucher identification data by selecting button 1002. Selection of button 1002 may cause the merchant device to receive voucher value data in accordance with some example embodiments discussed herein.

FIG. 11 shows an exemplary presentation of a Voucher Value Display in accordance with some example embodiments discussed herein. Display 1100 may be presented by a merchant device after capturing and/or otherwise receiving voucher identification data, and receiving and/or otherwise determining voucher value data from a remote system, such as promotional system 2402. Display 1100 may provide means for a merchant device to receive an indication to apply the received monetary discount value for the voucher to the current transaction, such as by selection of button 1102.

Figure 12:
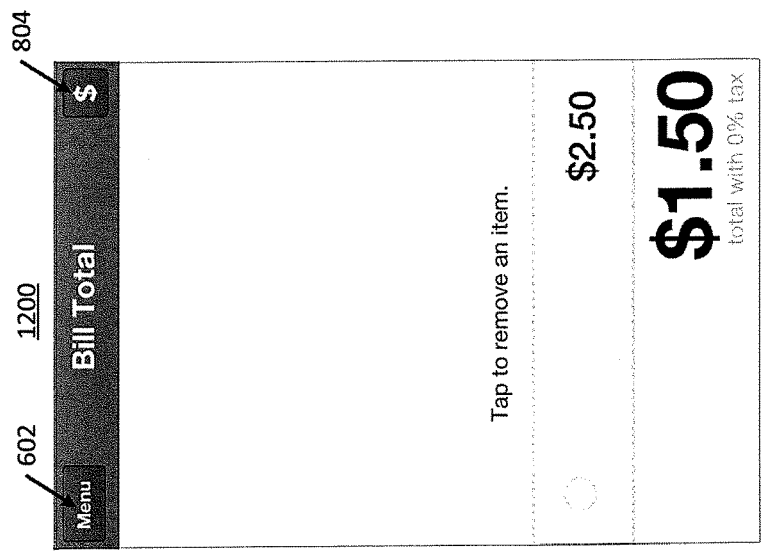
Figure 21:
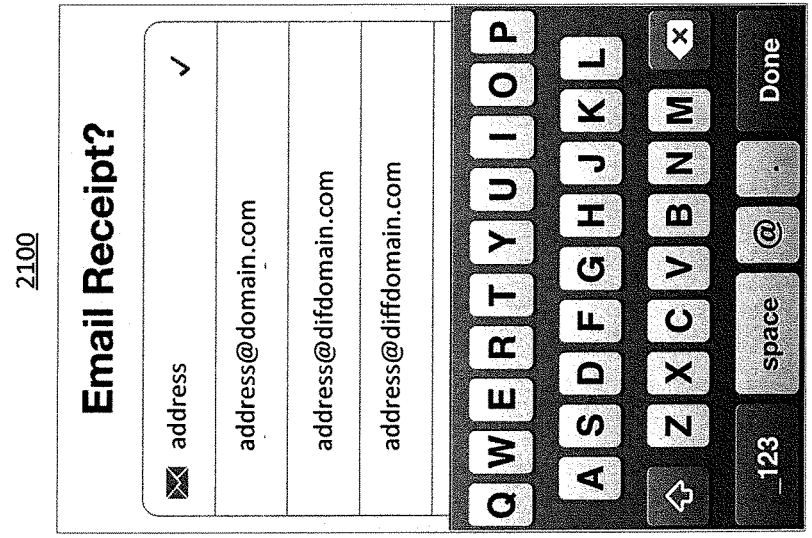
Figure 20:
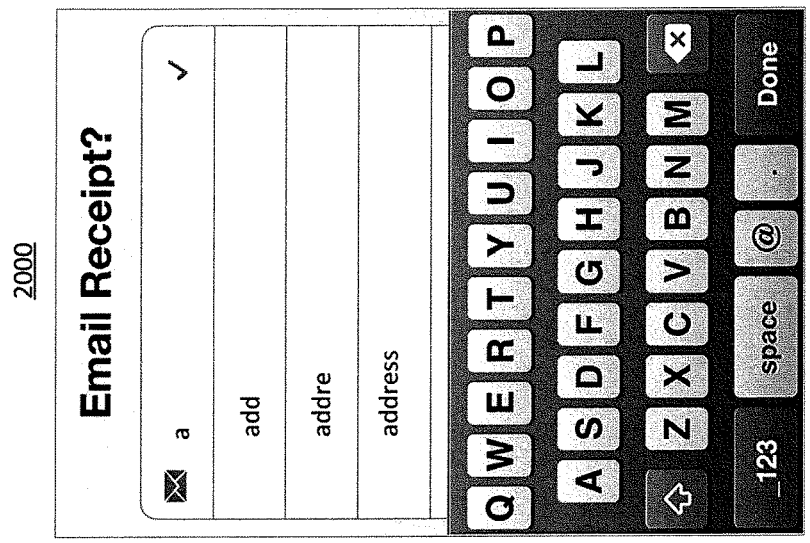

FIG. 12 shows an exemplary presentation of an Updated Transaction Data Display in accordance with some example embodiments discussed herein. Display 1200 may be presented by a merchant device upon indication that the monetary discount value of a voucher should be applied, such as by selection of button 1102. On display 1200, the merchant device may present one or more details of the current transaction including an updated transaction total after applying the monetary discount value of a voucher. The selection of button 804 indicates that the merchant device should return to the Transaction Checkout Display, such as shown by display 1300 of FIG. 13.

Figure 13:
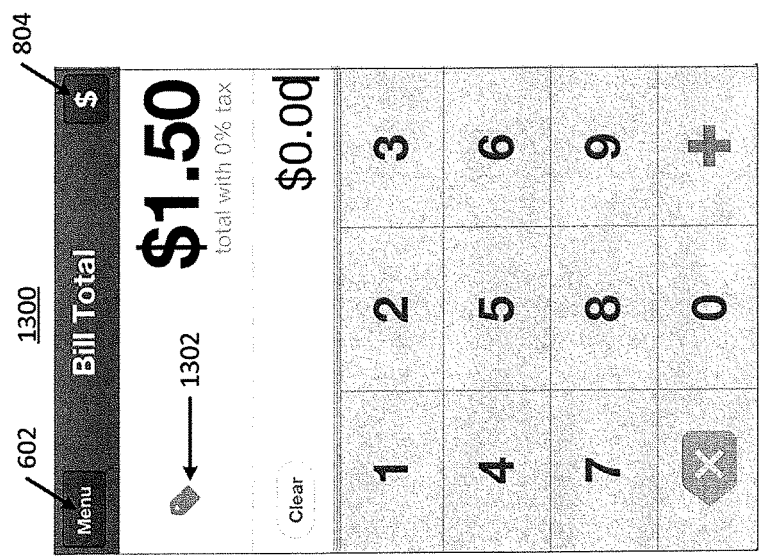

FIG. 13 shows a further exemplary presentation of the Transaction Checkout Display in accordance with some example embodiments discussed herein. Display 1300 may be presented upon a merchant device completing the updating of transaction data after applying a voucher value to the transaction. Display 1300 provides the current transaction total as well as an indication, such as by icon 1302, that voucher value has been applied to the current transaction. The selection of button 804 indicates that the merchant device should present a Payment Tender Selection Display, such as display 1400 of FIG. 14.

Figure 14:
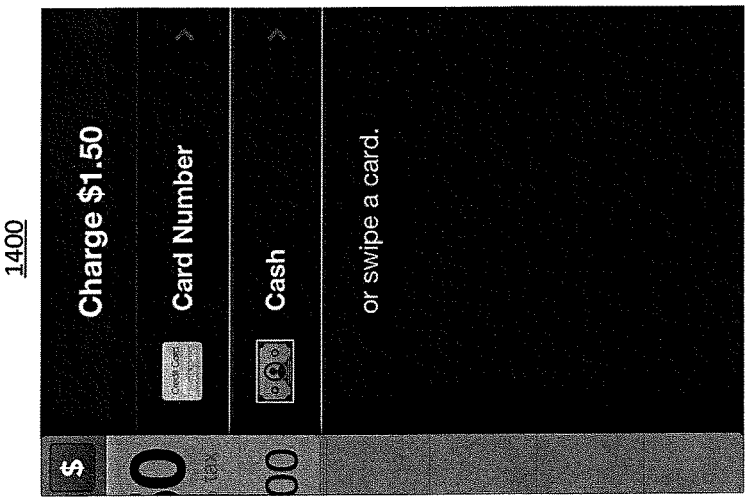

FIG. 14 shows a further exemplary presentation of the Payment Tender Selection Display in accordance with some example embodiments discussed herein. Display 1400 may be presented by a merchant device upon indication that a transaction is complete and payment is being tendered, such as by selection of button 804. Display 1400 provides for an indication of the type of tender that is being presented by a consumer. Tender types may include any type of payment method, such as cash, credit card, bank draft, electronic payment service (e.g. PayPal®), etc. The selection of a choice from the tender type listing, or swiping of a credit card using the capabilities of the merchant device, indicates that the merchant device should present a Payment Tender Display, such as one of display 1500 of FIG. 15 or display 1600 of FIG. 16.

FIGS. 15 and 16 show exemplary presentations of the Payment Tender Displays in accordance with some example embodiments discussed herein. Displays 1500 and 1600 provide interfaces for a merchant to receive the appropriate payment tender data, as necessary, to facilitate the settlement of a payment transaction. Buttons 1502 and 1602 provide an indication to the merchant device that the payment tender data is complete and the merchant device should perform appropriate operation to complete the payment transaction.

FIGS. 17 and 18 show exemplary presentations of the Consumer Authorization Displays in accordance with some example embodiments discussed herein. Displays 1700 and 1800 provide examples of one process for receiving a consumer authorization by capturing a consumer's signature.

FIGS. 19-23 show exemplary presentations of the Email Receipt Displays in accordance with some example embodiments discussed herein. Displays 1900-2200 provide for an indication that a receipt email should be generated and sent to a consumers email address. Selection of field 1902 provides for an indication that a receipt email should be sent, selection of button 1904 provides for an indication that a receipt email should not be sent. Selection of field 1902 may initiate an email address input process as shown by display 2000 and 2100 of FIGS. 20 and 21, respectively. A user may begin to input an email address and the display may provide suggestions based on the input string and/or a consumer profile stored locally at the merchant device and/or remotely (e.g., in a merchant database, credit card company database, bank database, promotional system database, etc.). A user may continue to input a complete email address or select one of the presented suggestions. Completion of the email address or selection of a suggestion may cause the merchant device to present display 2200 of FIG. 22 to allow for an indication that the receipt email should be sent, such as by selection of button 2202. Merchant device may then present display 2300 of FIG. 23 confirming that the transaction is complete and the receipt email has been sent.

FIG. 24 shows system 2400 including an example network architecture for a retailing system, which may include one or more devices and sub-systems that are configured to implement some embodiments discussed herein. For example, system 2400 may include promotional system 2402, which can include, for example, promotional server 2404 and promotional database 2406, among other things (not shown). Promotional server 2404 can be any suitable network server and/or other type of processing device. Promotional database 2406 can be any suitable network database configured to store merchant and user data, deal offering data, deal voucher data, transaction data and/or redemption data, such as that discussed herein. In this regard, system 2402 may include, for example, at least one backend data server, network database, cloud computing device, among other things.

Promotional system 2402 can be coupled to one or more merchant devices 2410A-2410N via network 2408. In this regard, network 2408 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 2408 may include a cellular telephone, an 802.11, 802.16, 802.20, and/or WiMax network. Further, the network 2408 may include a public network, such as the Internet, a private network, such as an intranet, or combinations thereof, and may utilize a variety of networking protocols now available or later developed including, but not limited to TCP/IP based networking protocols.

Merchant devices 2410A-2410N may each be implemented as a personal computer and/or other networked device, such as a cellular phone, tablet computer, mobile device, etc., that may be used for any suitable purpose in addition to buying deals and/or offering deals for sale. The depiction in FIG. 24 of "N" merchants is merely for illustration purposes. System 2400 may also include at least one 3rd party system 2412, among other things.

The contemplated methods, systems and apparatuses, such as described in regard to FIGS. 1-24 above, may allow for improved analytics of merchant and consumer trends and behaviors. Through the coordinated processing of deal voucher redemptions and payment transactions, a promotional system and/or merchant systems are able to gather greater and more detailed data on merchant and/or consumer behaviors and preferences and the relationships between a consumer's purchasing transactions and the purchase and redemption of deal offers. The enhanced data capturing may provide valuable improvements in the generation and marketing of deal offers in a promotional system and/or merchant system, such as enabling better targeting of promotions or offers and faster responses to emerging purchasing trends. This enhanced data collection and analysis may include data such as the value and/or level of transactions when deal vouchers are redeemed, differences in purchasing and payment behaviors when deal offers are or are not available; changes in timing for payments and deal redemptions, behaviors and preferences for particular consumers in relation to particular merchants or categories of merchants, and various other types of data related to consumer purchasing behavior.

FIG. 25 shows a schematic block diagram of circuitry 2500, some or all of which may be included in, for example, promotional system 2402, and/or merchant devices 2410A-2410N. As illustrated in FIG. 25, in accordance with some example embodiments, circuitry 2500 can includes various means, such as one or more processors 2502, memories 2504, communications modules 2506, and/or input/output modules 2508. In some embodiments, such as when circuitry 2500 is included in merchant devices 2410A-2410N and/or promotional system 2402, payment/redemption module 2510 may also or instead be included. As referred to herein, "module" includes hardware, software and/or firmware configured to perform one or more particular functions. In this regard, the means of circuitry 2500 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 2504) that is executable by a suitably configured processing device (e.g., processor 2502), or some combination thereof.

Processor 2502 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 25 as a single processor, in some embodiments, processor 2502 comprises a plurality of processors. The plurality of processors may be embodied on a single computing device or may be distributed across a plurality of computing devices collectively configured to function as circuitry 2500. The plurality of processors may be in operative communication with each other and may be collectively configured to perform one or more functionalities of circuitry 2500 as described herein. In an example embodiment, processor 2502 is configured to execute instructions stored in memory 2504 or otherwise accessible to processor 2502. These instructions, when executed by processor 2502, may cause circuitry 2500 to perform one or more of the functionalities of circuitry 2500 as described herein.

Whether configured by hardware, firmware/software methods, or by a combination thereof, processor 2502 may comprise an entity capable of performing operations according to embodiments of the present invention while configured accordingly. Thus, for example, when processor 2502 is embodied as an ASIC, FPGA or the like, processor 2502 may comprise specifically configured hardware for conducting one or more operations described herein. As another example, when processor 2502 is embodied as an executor of instructions, such as may be stored in memory 2504, the instructions may specifically configure processor 2502 to perform one or more algorithms and operations described herein, such as those discussed in connection with FIGS. 1-5.

Memory 2504 may comprise, for example, volatile memory, non-volatile memory, or some combination thereof. Although illustrated in FIG. 25 as a single memory, memory 2504 may comprise a plurality of memory components. The plurality of memory components may be embodied on a single computing device or distributed across a plurality of computing devices. In various embodiments, memory 2504 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 904 may be configured to store information, data (including deal parameter data and/or analytics data), applications, instructions, or the like for enabling circuitry 2500 to carry out various functions in accordance with example embodiments of the present invention. For example, in at least some embodiments, memory 2504 is configured to buffer input data for processing by processor 2502. Additionally or alternatively, in at least some embodiments, memory 2504 is configured to store program instructions for execution by processor 2502. Memory 2504 may store information in the form of static and/or dynamic information. This stored information may be stored and/or used by circuitry 2500 during the course of performing its functionalities.

Communications module 2506 may be embodied as any device or means embodied in circuitry, hardware, a computer program product comprising computer readable program instructions stored on a computer readable medium (e.g., memory 2504) and executed by a processing device (e.g., processor 2502), or a combination thereof that is configured to receive and/or transmit data from/to another device, such as, for example, a second circuitry 2500 and/or the like. In some embodiments, communications module 2506 (like other components discussed herein) can be at least partially embodied as or otherwise controlled by processor 2502. In this regard, communications module 2506 may be in communication with processor 2502, such as via a bus. Communications module 2506 may include, for example, an antenna, a transmitter, a receiver, a transceiver, network interface card and/or supporting hardware and/or firmware/software for enabling communications with another computing device. Communications module 2506 may be configured to receive and/or transmit any data that may be stored by memory 2504 using any protocol that may be used for communications between computing devices. Communications module 2506 may additionally or alternatively be in communication with the memory 2504, input/output module 2508 and/or any other component of circuitry 2500, such as via a bus.

Input/output module 2508 may be in communication with processor 2502 to receive an indication of a user input and/or to provide an audible, visual, mechanical, or other output to a user (e.g., merchant and/or consumer). Some example visual outputs that may be provided to a user by circuitry 2500 are discussed in connection with FIGS. 6-23. As such, input/output module 2508 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 2500 is embodied as a server or database, aspects of input/output module 2508 may be reduced as compared to embodiments where circuitry 2500 is implemented as an end-user machine (e.g., consumer device and/or merchant device) or other type of device designed for complex user interactions. In some embodiments (like other components discussed herein), input/output module 2508 may even be eliminated from circuitry 2500. Alternatively, such as in embodiments wherein circuitry 2500 is embodied as a server or database, at least some aspects of input/output module 2508 may be embodied on an apparatus used by a user that is in communication with circuitry 2500, such as for example, merchant device 2410. Input/output module 2508 may be in communication with the memory 2504, communications module 2506, and/or any other component(s), such as via a bus. Although more than one input/output module and/or other component can be included in circuitry 2500, only one is shown in FIG. 25 to avoid overcomplicating the drawing (like the other components discussed herein).

Payment/redemption module 2510 may also or instead be included and configured to perform the functionality discussed herein related to facilitating payment transactions and redemption of deal vouchers discussed above. In some embodiments, some or all of the functionality facilitating payment transactions and redemption of deal vouchers may be performed by processor 2502. In this regard, the example processes and algorithms discussed herein can be performed by at least one processor 2502 and/or payment/redemption module 2510. For example, non-transitory computer readable storage media can be configured to store firmware, one or more application programs, and/or other software, which include instructions and other computer-readable program code portions that can be executed to control each processor (e.g., processor 2502 and/or payment/redemption module 2510) of the components of system 2400 to implement various operations, including the examples shown above. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 2400. In some embodiments, one or more external systems (such as a remote cloud computing and/or data storage system) may also be leveraged to provide at least some of the functionality discussed herein.

FIGS. 26 and 27 provide some examples of data that may be stored in one or databases to facilitate payment transactions and redemption of deal vouchers in accordance with some example embodiments discussed herein. It should be noted the data fields illustrated are exemplary and that the embodiments of the invention are not limited to the fields illustrated in FIGS. 26 and 27, and that the embodiments of the invention may contain more or fewer fields than those illustrated.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 2502 and/or deal payment/redemption module 2510 discussed above with reference to FIG. 25, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 2504) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of securing a transaction by one or more servers connected with a merchant system over a network, comprising:
   receiving payment transaction data indicating a product from the merchant system via the network;
   receiving, by the one or more servers, payment account identifier data to be used for the transaction from the merchant system via the network;
   transmitting the payment account identifier data to a promotional machine configured for determining whether the payment account identifier data was utilized in a purchase of a deal voucher that was not presented with the payment account identifier data earlier in the process and subsequently received without also receiving deal voucher identifier data from the merchant system;
   in response to determining that the payment account identifier was utilized in a purchase of a deal voucher that was not presented with the payment account identifier data and was subsequently received without receiving the deal voucher identifier data from the merchant system, retrieving, by the one or more servers, voucher data associated with a deal voucher from one or more databases based on the payment account identifier data, wherein the deal voucher data stored in the one or more databases includes associations of stored deal vouchers with stored payment account identifier data that identify payment accounts used to purchase the stored deal vouchers;
   before a completion of the transaction, determining, by the one or more servers, whether the payment account identifier is associated with a payment account used to purchase the deal voucher based on the voucher data retrieved from the one or more servers; and
   in response to determining that the payment account identifier data is associated with the payment account used to purchase the deal voucher, and by the one or more servers:
      determining a current monetary value of the deal voucher;
      transmitting deal voucher data, including at least the current monetary value of the deal voucher to the merchant system via the network; and
      processing the transaction using the payment account used to purchase the deal voucher;
   determining whether the product is associated with a second deal voucher, the second deal voucher configured such that the second deal voucher must be purchased before a value associated therewith can be applied to a transaction, the second deal voucher having not been purchased by the payment account identified by the payment account identifier data;
   in response to determining that the product is associated with the second deal voucher, the second deal voucher having not been purchased by the payment account, transmitting an offer for the second deal voucher to the merchant system;
   providing an offer to purchase the second deal voucher and redeem the second deal voucher towards the product in the transaction;
   receiving an indication to purchase the second deal voucher with the payment account identified by the payment account identifier; and in response to receiving the indication to purchase the second deal voucher, applying the second deal voucher to the processing of the transaction.

2. The method of claim 1, further comprising:
receiving a voucher redeemed notification message from the merchant system, the voucher redeemed notification message including voucher identifier data;
retrieving the voucher data from a database based on the voucher identifier data; and
updating the voucher data to indicate redemption of the deal voucher.

3. A method of securing a transaction by a point-of-sale (POS) device connected with a remote system over a network, comprising:
receiving by the point-of-sale device, payment transaction data, including a product price associated with the transaction;
receiving, by the POS device, an indication of a payment tender, including payment account identifier data;
transmitting, by the POS device, payment account identifier data to a remote system via the network without transmitting deal voucher identifier data;
transmitting, by the remote system, the payment account identifier data to a promotional machine configured for determining whether the payment account identifier data was utilized in a purchase of a deal voucher that was not presented with the payment account identifier data earlier in the process and subsequently received without also receiving deal voucher identifier data from the merchant system;
in response to transmitting the payment account identifier data, and determining that the payment account identifier was utilized in a purchase of a deal voucher that was not presented with the payment account identifier data and was subsequently received without receiving the deal voucher identifier data from the merchant system, and before a completion of the transaction, receiving, by the POS device, deal voucher data associated with the payment account identifier data from the remote system and via the network, the deal voucher data including a monetary discount value currently associated with a deal voucher that the remote system determines was purchased using a payment account identified by the payment account identifier data, wherein the payment account identifier data is associated with the deal voucher data in one or more databases of the remote system;
in response to receiving the deal voucher data indicating that the deal voucher was purchase using the payment account identified by the payment account identifier data, generating, by the POS device, an amount due value by subtracting the monetary discount value from the product price;
receiving an offer to purchase and redeem a second deal voucher toward the amount due value of the transaction from the remote system via the network, wherein the second deal voucher is configured such that the second deal voucher must be purchased before a value associated therewith can be applied to a transaction, the second deal voucher has not been purchased by the payment account,
transmit an indication to purchase the second deal voucher with the payment account identified by the payment account identifier to the remote system via the network; and
facilitating, by the POS device, settlement of the payment tender using the payment account used to purchase the deal voucher while applying the second deal voucher to the facilitation of the transaction.

4. The method of claim 3, further comprising:
generating a voucher redeemed notification message that causes the remote system to update the deal voucher data as redeemed; and
transmitting the voucher redeemed notification message subsequent to facilitating the settlement of the payment tender.

5. The method of claim 3, further comprising:
receiving a consumer email address;
generating a message including payment settlement data indicating the settlement of the payment and the deal voucher data; and
transmitting the message to the consumer email address.

6. The method of claim 3, wherein the monetary discount value currently associated with the deal voucher data is less than a discount value previously associated with the deal voucher.

7. The method of claim 3, wherein the monetary discount value currently associated with the deal voucher data is greater than a discount value to be associated with the deal voucher in the future.

8. The method of claim 3, wherein receiving the indication of the payment tender comprises receiving a credit card account number.

9. An apparatus connected with a merchant system via a network for securing a transaction over the network, comprising at least one processor and at least one memory including computer program instructions, the at least one memory and the computer program instructions configured to, with the at least one processor, cause the apparatus to at least:
receive payment account identifier data to be used for the transaction from the merchant system via the network;
receive payment transaction data indicating a product from the merchant system via the network;
transmitting the payment account identifier data to a promotional machine configured for determining whether the payment account identifier data was utilized in a purchase of a deal voucher that was not presented with the payment account identifier data earlier in the process and subsequently received without also receiving deal voucher identifier data from the merchant system;
in response to determining that the payment account identifier was utilized in a purchase of a deal voucher that was not presented with the payment account identifier data and was subsequently received without receiving the deal voucher identifier data from the merchant system, retrieve voucher data associated with a deal voucher from one or more databases based on the payment account identifier data, wherein the deal voucher data stored in the one or more databases includes associations of stored deal vouchers with stored payment account identifier data that identify payment accounts used to purchase the stored deal vouchers;
before a completion of the transaction, determine, whether the payment account identifier data is associated with a payment account used to purchase the deal voucher based on the voucher data retrieved from the one or more servers; and
in response to determining that the payment account identifier data is associated with the payment account used to purchase the deal voucher:
determine a current monetary value of the deal voucher;

transmit deal voucher data, including at least the current monetary value of the deal voucher, to the merchant system via the network; and process the transaction using the payment account used to purchase the deal voucher;

determine whether the product is associated with a second deal voucher that has not been purchased by the payment account identified by the payment account identifier data;

in response to determining that the product is associated with the second deal voucher configured such that the second deal voucher must be purchased before a value associated therewith can be applied to a transaction, the second deal voucher having not been purchased by the payment account, transmit an offer for the second deal voucher to the merchant system;

providing an offer to purchase the second deal voucher and redeem the second deal voucher towards the product in the transaction;

receive an indication to purchase the second deal voucher with the payment account identified by the payment account identifier; and in response to receiving the indication to purchase the second deal voucher, apply the second deal voucher to the processing of the transaction.

10. The apparatus of claim 9, the at least one memory and the computer program instructions further configured to, with the at least one processor, cause the apparatus to at least:

receive a voucher redeemed notification message from the merchant system, the notification message including voucher identifier data;

retrieve voucher data from a database based on the voucher identifier data; and update the voucher data to indicate redemption of the deal voucher.

11. An apparatus for securing a transaction over a network, comprising at least one processor and at least one memory including computer program instructions, the at least one memory and the computer program instructions configured to, with the at least one processor, cause the apparatus to at least:

receive payment transaction data, including a product price, to be used for the transaction;

receive an indication of a payment tender, including payment account identifier data;

transmit payment account identifier data to a remote system via the network without transmitting any deal voucher identifier data;

transmit, by the remote system, the payment account identifier data to a promotional machine configured for determining whether the payment account identifier data was utilized in a purchase of a deal voucher that was not presented with the payment account identifier data earlier in the process and subsequently received without also receiving deal voucher identifier data from the merchant system;

in response to transmitting the payment account identifier data, and determining that the payment account identifier was utilized in a purchase of a deal voucher that was not presented with the payment account identifier data and was subsequently received without receiving the deal voucher identifier data from the merchant system, and before a completion of the transaction, receive deal voucher data associated with the payment account identifier data from the remote system and via the network, the deal voucher data including a monetary discount value currently associated with a deal voucher that the remote system determines was purchased using a payment account identified by the payment account identifier data;

generate an amount due value by subtracting the monetary discount value from the product price;

receive an offer to purchase and redeem a second deal voucher toward the amount due value of the transaction from the remote system via the network, wherein the second deal voucher is configured such that the second deal voucher must be purchased before a value associated therewith can be applied to a transaction, the second deal voucher has not been purchased by the payment account, and transmit an indication to purchase the second deal voucher with the payment account identified by the payment account identifier to the remote system via the network; and facilitate settlement of the payment tender using the payment account used to purchase the deal voucher while applying the second deal voucher to the facilitation of the transaction.

12. The apparatus of claim 11, the at least one memory and the computer program instructions further configured to, with the at least one processor, cause the apparatus to at least:

generate a voucher redeemed notification message that causes the remote system to update the deal voucher data as redeemed; and transmit the voucher redeemed notification signal subsequent to facilitating the settlement of the payment tender.

13. The apparatus of claim 11, the at least one memory and the computer program instructions further configured to, with the at least one processor, cause the apparatus to at least:

receive a consumer email address;

generate a message including payment settlement data indicating the settlement of the payment and the deal voucher data; and transmit the message to the consumer email address.

14. The apparatus of claim 11, wherein the monetary discount value currently associated with the deal voucher data is less than a discount value previously associated with the deal voucher.

15. The apparatus of claim 11, wherein the monetary discount value currently associated with the deal voucher data is greater than a discount value to be associated with the deal voucher in the future.

16. The apparatus of claim 11, wherein receiving the indication of the payment tender comprises receiving a credit card account number.

17. The method of claim 1 further comprising, by the one or more servers:

receiving payment transaction data indicating a product from the merchant system via the network;

determining whether the product is associated with a second deal voucher, the second deal voucher having not been purchased by the payment account identified by the payment account identifier data;

in response to determining that the product is associated with the second deal voucher, the second deal voucher having not been purchased by the payment account, transmitting an offer for the second deal voucher to the merchant system;

receiving an indication to purchase the second deal voucher with the payment account identified by the payment account identifier; and in response to receiving the indication to purchase the second deal voucher, applying the second deal voucher to the processing of the transaction.

18. The method of claim 3 further comprising, by the POS device:
   transmitting second payment transaction data indicating a second product to the remote system via the network;
   in response to transmitting the second payment transaction data, receiving an offer for a second deal voucher from the remote system via the network when the second deal voucher associated with the second product has not been purchased by the payment account, and
   transmitting an indication to purchase the second deal voucher with the payment account identified by the payment account identifier to the remote system via the network; and
   applying the second deal voucher to the processing of the transaction.

19. The apparatus of claim 9, wherein the at least one memory and the computer program instructions further configured to, with the at least one processor, cause the apparatus to at least:
   receive payment transaction data indicating a product from the merchant system via the network;
      determine whether the product is associated with a second deal voucher that has not been purchased by the payment account identified by the payment account identifier data;
      in response to determining that the product is associated with the second deal voucher that has not been purchased by the payment account, transmit an offer for the second deal voucher to the merchant system;
   receive an indication to purchase the second deal voucher with the payment account identified by the payment account identifier; and
      in response to receiving the indication to purchase the second deal voucher, apply the second deal voucher to the processing of the transaction.

20. The apparatus of claim 11, wherein the at least one memory and the computer program instructions further configured to, with the at least one processor, cause the apparatus to at least:
   transmit second payment transaction data indicating a second product to the remote system via the network;
   in response to transmitting the second payment transaction data, receive an offer for a second deal voucher from the remote system via the network when the second deal voucher associated with the second product has not been purchased by the payment account, and
   transmit an indication to purchase the second deal voucher with the payment account identified by the payment account identifier to the remote system via the network; and
   apply the second deal voucher to the processing of the transaction.

* * * * *